US011579049B2

(12) United States Patent
Wu et al.

(10) Patent No.: US 11,579,049 B2
(45) Date of Patent: Feb. 14, 2023

(54) DIFFUSIVE GRADIENTS IN THIN FILMS (DGT) PROBE TEST DEVICE FOR SEDIMENT CORE IN LAKE AND TEST METHOD USING THE SAME

(71) Applicant: Chinese Research Academy of Environmental Sciences, Beijing (CN)

(72) Inventors: Zhihao Wu, Beijing (CN); Shuhang Wang, Beijing (CN); Xia Jiang, Beijing (CN); Bo Zhang, Beijing (CN); Kun Wang, Beijing (CN); Wenwen Wang, Beijing (CN); Junyi Chen, Beijing (CN); Li Zhao, Beijing (CN); Qing Cai, Beijing (CN); Cheng Yao, Beijing (CN)

(73) Assignee: Chinese Research Academy of Environmental Sciences, Beijing (CN)

( * ) Notice: Subject to any disclaimer, the term of this patent is extended or adjusted under 35 U.S.C. 154(b) by 267 days.

(21) Appl. No.: 17/142,927

(22) Filed: Jan. 6, 2021

(65) Prior Publication Data
US 2021/0208031 A1   Jul. 8, 2021

(30) Foreign Application Priority Data
Jan. 7, 2020   (CN) .......................... 202010015518.8

(51) Int. Cl.
*G01N 1/08* (2006.01)
*E21B 7/124* (2006.01)
*G01N 1/28* (2006.01)

(52) U.S. Cl.
CPC ............... *G01N 1/08* (2013.01); *E21B 7/124* (2013.01); *G01N 1/286* (2013.01)

(58) Field of Classification Search
CPC .... G01N 1/02; G01N 1/08; G01N 2001/1031; G01N 1/12; G01N 1/18; G01N 1/28; G01N 1/286; G01N 2001/381; G01N 2001/382
See application file for complete search history.

(56) References Cited

U.S. PATENT DOCUMENTS

2021/0208033 A1*   7/2021   Wang ................. G01N 33/1826

FOREIGN PATENT DOCUMENTS

| CN | 103759968 A | * | 4/2014 | ............... G01N 1/10 |
| CN | 104964849 A | * | 10/2015 | ............... G01N 1/12 |
| DE | 10346351 B3 | * | 12/2004 | ............... G01N 1/04 |

\* cited by examiner

*Primary Examiner* — Benjamin R Schmitt
(74) *Attorney, Agent, or Firm* — Neugeboren O'Dowd PC (57) ABSTRACT

The present disclosure provides a diffusive gradients in thin films (DGT) probe test device for a sediment core in a lake, including: a sampling tube, where, a settlement limit device is disposed on an outer wall of the sampling tube and a DGT probe and a multi-parameter water-quality detection electrode are installed within the sampling tube; a movable mudguard device comprising a connecting rod and a mudguard, where, the connecting rod rotates around a rotating shaft to drive the mudguard to move from a position where an opening at the lower end of the sampling tube is sealed to a side of the sampling tube; a position-limit mechanism removably installed outside the sampling tube; a hammering device located above the sampling tube and fixedly connected to the sampling tube; and a floating ball located above the hammering device and connected to the hammering device via a first pull rope.

21 Claims, 7 Drawing Sheets

DIFFUSIVE GRADIENTS IN THIN FILMS (DGT) PROBE TEST DEVICE FOR SEDIMENT CORE IN LAKE AND TEST METHOD USING THE SAME

CLAIM OF PRIORITY UNDER 35 U.S.C. § 119

The present application for patent claims priority to Chinese Patent Application No. 202010015518.8 entitled "DIFFUSIVE GRADIENTS IN THIN FILMS (DGT) PROBE TEST DEVICE FOR SEDIMENT CORE IN LAKE AND TEST METHOD USING THE SAME" filed with the China National Intellectual Property Administration on Jan. 7, 2020 and assigned to the assignee hereof and hereby expressly incorporated by reference herein.

TECHNICAL FIELD

The present disclosure belongs to the fields of lake water environment science and environmental geochemistry, and specifically relates to a diffusive gradients in thin films (DGT) probe test device for a sediment core in lake and a test method using the same.

DESCRIPTION OF RELATED ART

The diffusive gradients in thin films (DGT) technique is mainly based on Fick's first law of diffusion. The gradient diffusion of elements in the DGT diffusive layer and the buffer kinetics of the elements are studied to obtain information of the elements such as the available content and spatial distribution in an environmental medium, the binding kinetics for ionic state-complex state of element, and the exchange kinetics for element at solid-liquid interface. DGT technique can be applied to many studies on water environment, including: geochemical characteristics of sediments, monitoring of water quality, kinetics of to-be-tested ions at an interface between DGT and soil or DGT and sediment, bioavailability of heavy metals and phosphorus, and so on.

Traditionally, the analysis of the active elements in pore water of lake sediment is mainly conducted by collecting sediment cores and then collecting pore water by centrifugation and extrusion for testing. The traditional experimental method has the major shortcoming that some physical, chemical, and biological changes will inevitably occur in a sediment column during processes of collecting, transporting to a laboratory, splitting the column, and centrifugation, and a tested sample cannot truly reflect the actual existent element species. DGT technique is an in-situ measurement technology with a high spatial resolution, where, a DGT probe is installed in a test device and then the test device is placed in on-site sediment of a lake to realize in-situ test, which can accurately measure the active elements in sediment without destroying the structure of sediment cores in a lake and provide an effective tool for studying a diagenetic process of the active elements and the influence of their environmental processes. The existing in-situ DGT detection devices mainly include the following categories: (1) Simple DGT probe test device, where, a DGT probe is inserted into a sediment using a tool and an anchor-shaped device is near the DGT probe; the top of the anchor-shaped device is connected to the top of the DGT probe via a rope, and the top of the anchor-shaped device is connected to a floating ball via another rope; and the floating ball floats on the surface of the water to indicate the exact position of DGT probe so that DGT probe can be taken out after DGT test. This simple detection device has a disadvantage that the position of a sediment/water interface of DGT probe cannot be accurately identified because the surface of the probe will be scoured by water flow during a sampling process. (2) Gravity DGT test device that is a gravity device provided with a recess at a lower end thereof, where, a DGT probe is placed in the recess; a section of sponge with many small holes is attached to the back of the DGT probe; and a thin plastic layer is installed on an upper end of DGT probe. When DGT probe inside the gravity device is placed in sediment, the plastic layer will be floated by water, and then the gravity device will be lifted from water. After a test is completed, DGT probe is taken out, and the plastic layer will be attached to the surface of the DGT probe again to protect a sediment imprint on an interface between DGT probe and the sponge layer from being washed away by water. In this way, after the DGT probe is taken out, clear imprints at sediment/overlying water interface will be left on the sponge layer and the surface of DGT probe so that the position of the sediment/water interface of DGT probe can be accurately determined.

However, the above-mentioned gravity DGT test device still has the disadvantage that the device does not have a sediment sampling function, that is, the device cannot simultaneously collect an overlying water or sediment sample from a DGT test area after the DGT probe test. It is an ideal method for DGT research to collect sediment and overlying water samples from a DGT test area, analyze the sediment, pore water and overlying water, and then compare these analytical results with DGT test results. Moreover, the existing devices cannot realize the simultaneous measurement of environmental parameters of sediment. Moreover, the existing DGT test devices cannot be conveniently and stably operated in lake water, and an experimental operation is difficult on site.

SUMMARY

The present disclosure is intended to solve the technical problem that a DGT test device in the prior art does not have a sediment sampling function, cannot simultaneously collect overlying water or sediment samples from a DGT test area, cannot realize the simultaneous measurement of environmental parameters of sediment, and is difficult to operate. The present disclosure thus provides a DGT probe test device for a sediment core in lake that is easy to operate and can realize simultaneous DGT test, sampling and environmental condition determination. The present disclosure also provides a test method based on the test device.

To achieve the above purpose, the present disclosure provides the following technical solutions.

In some embodiments, a DGT probe test device for a sediment core in lake includes: a sampling tube, where, a lower end of the sampling tube is open, a settlement limit device is disposed on an outer wall of the sampling tube, a DGT probe and a multi-parameter water-quality detection electrode are installed within the sampling tube, and the DGT probe extends in a vertical direction from above of the settlement limit device to below the settlement limit device; a movable mudguard device comprising a connecting rod and a mudguard, where, one end of the connecting rod is installed outside the sampling tube via a rotating shaft; the mudguard is fixedly installed on the other end of the connecting rod; and the mudguard rotates around the rotating shaft under gravity and falls from a side of the sampling tube to an opening at the lower end of the sampling tube, so as to seal the opening at the lower end of the sampling tube; a position-limit mechanism removably installed outside the sampling tube and configured to limit the movable mudguard device and confine the mudguard to a side of the sampling tube; a hammering device located above the sampling tube and fixedly connected to the sampling tube; and a floating ball located above the hammering device and connected to the hammering device via a first pull rope.

A sealing cover is disposed at a top opening of the sampling tube, and a through-hole is disposed on the sealing cover; the sealing cover is sleeved on a center column arranged in the vertical direction via the through-hole, and is suitable to slide along the center column from a position at the top opening of the sampling tube to the above of the top opening of the sampling tube; and the sealing cover, when located at the top opening of the sampling tube, seals the top opening of the sampling tube.

A locking device for installing the DGT probe and the multi-parameter water-quality detection electrode is disposed in the sampling tube, which is removably installed in the sampling tube; the locking device comprises a cross-shaped frame arranged in a horizontal direction; an installing hole is disposed at a central crossing position of the cross-shaped frame in a vertical direction; a top handle of the DGT probe is suitable to be inserted into the installing hole; a pin hole is disposed on a side wall of the installing hole; a fixing pin for fixing the DGT probe is disposed in the pin hole; and the multi-parameter water-quality detection electrode is fixed on at least one of four side borders of the cross-shaped frame via a plastic ring.

The settlement limit device is a settlement limit plate installed in the middle of the sampling tube and provided with water permeable holes; two boxes respectively with a power supply and a controller are installed on the settlement limit plate; the power supply is connected to the controller; and the multi-parameter water-quality detection electrode is connected to an interface of the controller.

Two iron ring layers are disposed above the sampling tube and are fixedly connected to each other via a column fixed between an upper iron ring layer and a lower iron ring layer; the lower iron ring layer is fixedly connected to the settlement limit plate; the hammering device is installed on a top surface of the upper iron ring layer; the sampling tube is fixed on the lower iron ring layer via a sampling tube fixing clip; the lower iron ring layer is provided with a perforation arranged corresponding to the top opening of the sampling tube; and the center column is fixedly connected to the upper iron ring layer.

The hammering device is a cylindrical hammering block; at least three suspension rings are disposed on a top surface of the hammering block, which are evenly arranged along an edge of the top surface of the hammer block; each of the suspension rings is connected to a bottom of a second pull rope via a connecting rope; and a top of the second pull rope is connected to the floating ball.

The position-limit mechanism is a limit pin, and an upper end of the limit pin is connected to the floating ball via a third pull rope.

A Rhizon interface is disposed on a wall of the sampling tube in the vertical direction, and a plugging device is disposed at the Rhizon interface.

The locking device is removably fixed on an inner wall of the sampling tube, and both ends of the sampling tube are open; and a piston jacking device is also disposed, which is suitable to slide along the inner wall of the sampling tube. The locking device is used to push sediment layer out of the sampling tube after DGT test and the retrieval of the DGT test device for a sediment core in lake from lake water.

In some embodiments, a test method based on the above DGT probe test device for a sediment core in lake includes: (1) placing the DGT probe test device for a sediment core in lake in a lake water, and making the lower end of the sampling tube contact with a surface of sediment in the lake; pulling the first pull rope to make the hammering device float, releasing the hammering device to make the hammering device sink under gravity, and repeating the operations many times until the sampling tube is inserted into the sediment and the surface of the sediment contacts the settlement limit device, at which time, a part of the DGT probe is inserted into the sediment, enabling an in-situ DGT test; and using the multi-parameter water-quality detection electrode to determine physical and chemical properties of the surface sediment; (2) after the test is completed, pulling out the position-limit mechanism so that the mudguard falls from a side of the sampling tube to an opening at the lower end of the sampling tube under gravity to seal the opening at the lower end; removing the DGT probe test device for a sediment core in lake out from the water body; taking out the DGT probe, and slicing and analyzing a binding gel of the DGT probe; calculating a DGT concentration of a target substance in pore water in a sediment corresponding to each DGT binding gel segment; and conducting section operation for sediment core in the sampling tube with the aid of a piston jacking device, and conducting solid-phase chemical analysis for the sediment.

The DGT probe test device for a sediment core in lake and the test method according to the present disclosure have the following advantages:

When in use, the DGT probe test device for a sediment core in lakes according to the present disclosure is placed in lake water; the first pull rope is pulled to make the hammering device float, then the hammering device is released to make the hammering device sink under gravity, and with the aid of a plastic ruler, the operations are repeated many times until the sampling tube is inserted into the sediment and the surface of the sediment contacts with the settlement limit device, at which time, a part of the DGT probe is inserted into the sediment, enabling an in-situ DGT test; and the multi-parameter water-quality detection electrode is simultaneously used to determine physical and chemical properties of the surface sediment.

The test device according to the some embodiments is provided with a movable mudguard device including a connecting rod and a mudguard, where, one end of the connecting rod is installed outside the sampling tube via a rotating shaft; the mudguard is fixedly installed on the other end of the connecting rod; and the mudguard rotates around the rotating shaft under gravity and falls from a side of the sampling tube to an opening at the lower end of the sampling tube, so as to seal the opening at the lower end. The test device according to the present disclosure is also provided with a position-limit mechanism removably installed outside the sampling tube and configured to limit the movable mudguard device and confine the mudguard to a side of the sampling tube, thus reaching a temporary stable state. After a DGT test is completed, the position-limit mechanism is pulled out and the temporary stable state is destructed so that the mudguard falls from a side of the sampling tube to the opening at the lower end of the sampling tube under gravity to seal the opening at the lower end; the DGT probe test device for a sediment core in lake is removed from the water; and the DGT probe is taken out, and a binding gel of the DGT probe is sliced and analyzed. Since the opening at the lower end of the sampling tube has been sealed at this time, sediment in the sampling tube will not fall off during movement, so that the collection of sediment core samples from a DGT test area is synchronously achieved.

In an embodiment, the sampling tube may also be provided with a Rhizon interface for subsequent sediment pore water sampling, so as to facilitate the subsequent collection and analysis of pore water.

In order to make the technical solutions of the DGT probe test device for a sediment core in lake and the test method provided in the present disclosure more comprehensible, the present disclosure will be further described in detail below in conjunction with specific drawings and specific examples.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

Reference numerals in the drawings are as follows:

1 represents a sampling tube; 2 represents a settlement limit plate; 21 represents a water permeable hole; 3 represents a lower iron ring layer; 4 represents an upper iron ring layer; 5 represents a hammering block; 6 represents a connecting rod; 7 represents a floating ball; 8 represents a mudguard; 9 represents a plastic ruler; 91 represents a box with a power supply; 92 represents a box with a controller; 10 represents a first column; 101 represents a first pull rope; 100 represents a center column; 102 represents a second pull rope; 103 represents a third pull rope; 104 represents a sampling tube fixing clip; 105 represents a sealing cover at the top of the sampling tube; 106 represents a gasket limit pin; 11 represents a second column; 12 represents a limit pin; 13 represents a DGT probe; 14 represents a multi-parameter water-quality detection electrode; 15 represents a cross-shaped frame; 16 represents a Rhizon interface; 151 represents a plastic ring; 152 represents a pin hole; and 17 represents a cross bar.

DETAILED DESCRIPTION

Figure 1:
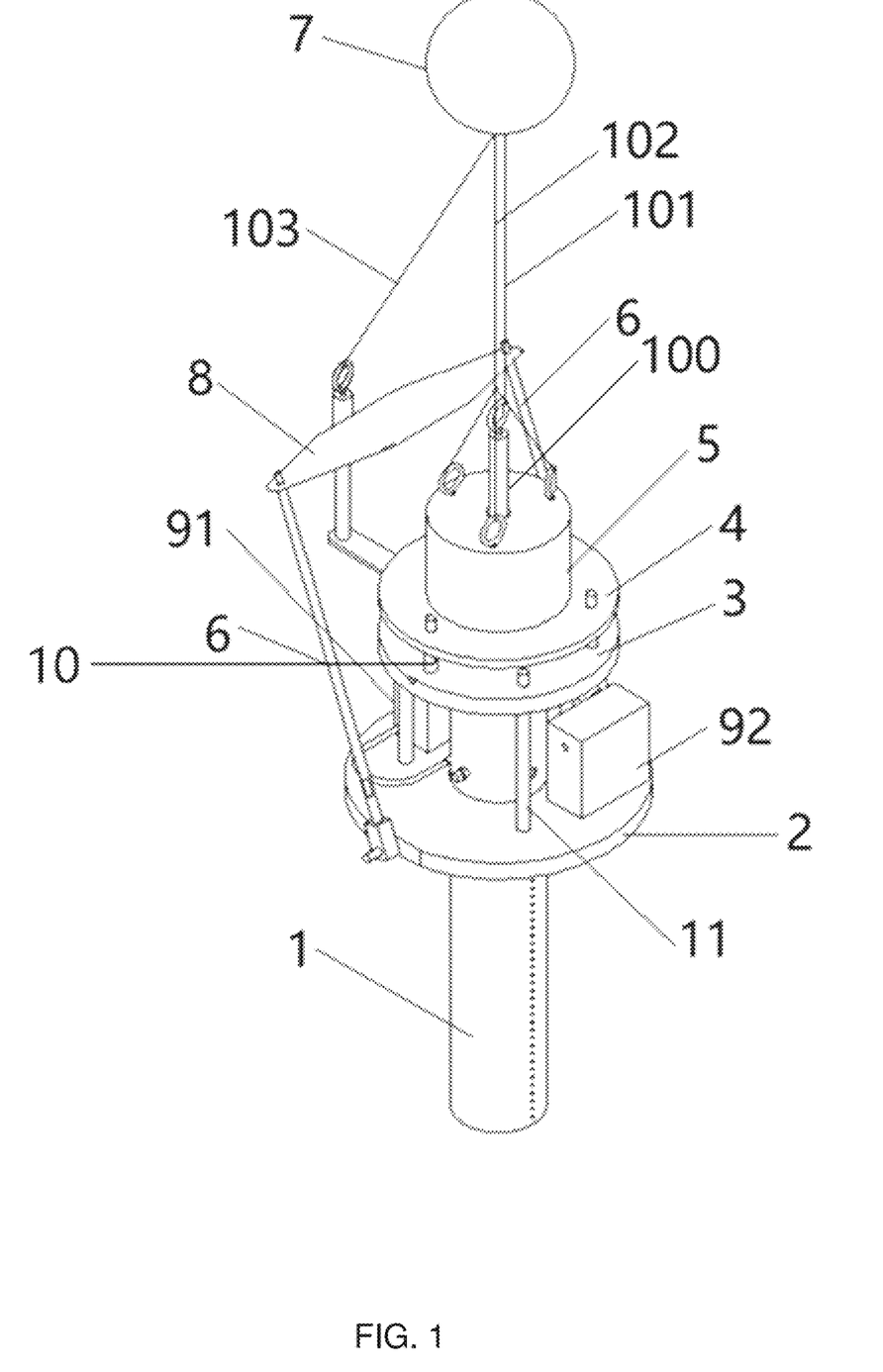
FIG. 1 is a schematic diagram illustrating a structure of the DGT probe test device for a sediment core in lake with a floating ball and pull ropes according to an embodiment of the present disclosure.
Figure 2:
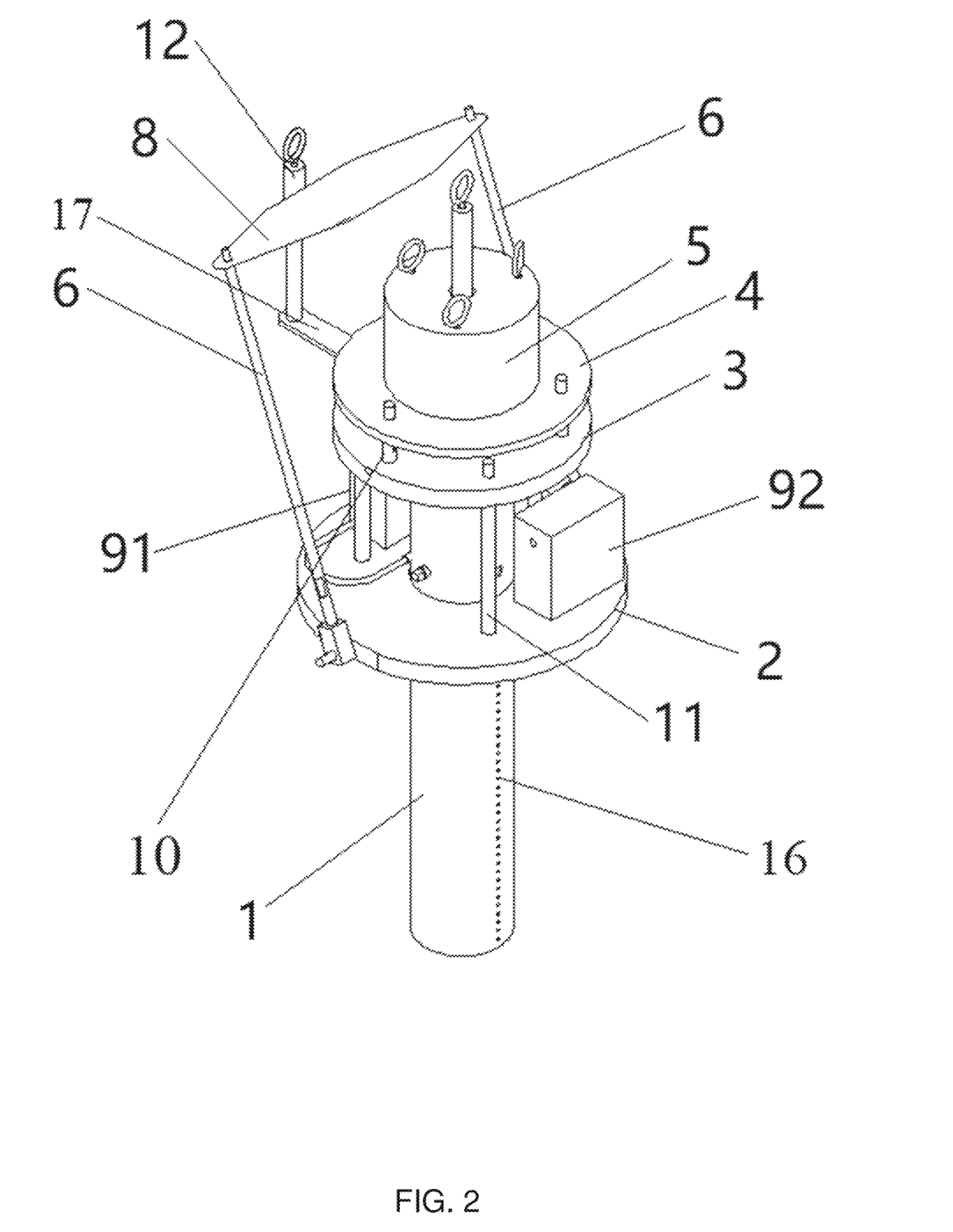
FIG. 2 is a schematic diagram illustrating a structure of the DGT probe test device for a sediment core in lake where the mudguard is on a side according to an embodiment of the present disclosure.

In an embodiment a DGT probe test device for a sediment core in a lake is disclosed, as shown in FIG. 1 and FIG. 2, including: a sampling tube 1, a movable mudguard device, a position-limit mechanism, a hammering device, and a floating ball 7.

The sampling tube 1 can have a diameter of 10 cm and a height of 50 cm; a lower end and a top end of the sampling tube 1 are both open; a Rhizon interface 16 is disposed on a wall of the sampling tube 1 in a vertical direction; and the Rhizon interface 16 is provided with a plugging device, specifically a plug.

Figure 3:
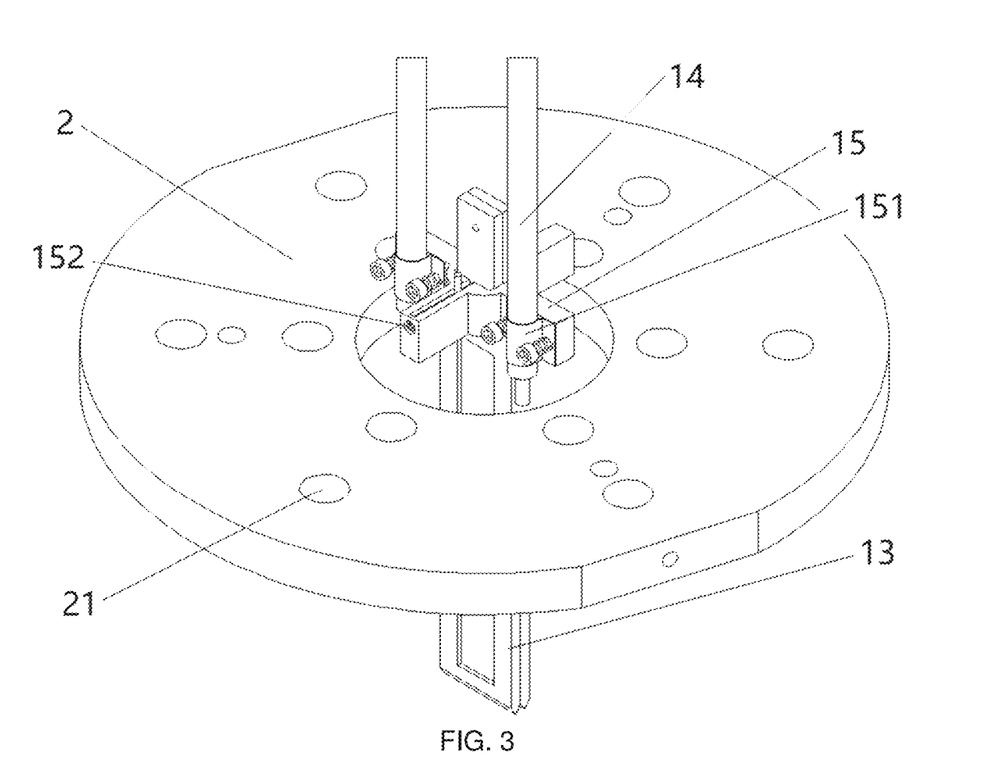
FIG. 3 is a schematic diagram illustrating a structure of the locking device according to an embodiment of the present disclosure.

A settlement limit device is disposed on an outer wall of the sampling tube 1, and specifically, the settlement limit device is a settlement limit plate 2 fixedly installed on the outer wall of the sampling tube 1. The settlement limit plate 2 is an annular sampling plate disposed surround the outer wall of the sampling tube 1, which is fixed on the outer wall of the sampling tube 1 via screws. 10 water permeable holes 21 are evenly distributed on a surface of the settlement limit plate 2 so that a water flow can pass through the settlement limit plate 2 when the test device is put down, and the settlement limit plate 2 will not prevent the material exchange between surface water and sediment outside the sampling tube. A DGT probe 13 and a multi-parameter water-quality detection electrode 14 are installed within the sampling tube 1. The DGT probe 13 extends in the vertical direction from the above of the settlement limit plate 2 to the below of the settlement limit device. A locking device for installing the DGT probe 13 and the multi-parameter water-quality detection electrode 14 is disposed in the sampling tube 1. As shown in FIG. 3, the locking device includes a cross-shaped frame 15 arranged in a horizontal direction that is formed by intersecting two in-line borders. The cross-shaped frame 15 is fixedly connected to an inner wall of the sampling tube 1. In this embodiment, the cross-shaped frame 15 is removably installed on the inner wall of the sampling tube 1, for example, fixedly installed by screws. An installing hole is disposed at a central crossing position of the cross-shaped frame 15 in the vertical direction, a top handle of the DGT probe 13 is suitable to be inserted into the installing hole, and a pin hole 152 is disposed on a side wall of the installing hole. As a preferred embodiment, the pin hole 152 is disposed on one of the in-line borders, an opening at one end of the pin hole 152 is located on one end surface of the in-line border, and an opening at the other end is toward the installing hole. A fixing pin for fixing the DGT probe 13 is disposed in the pin hole 152. In this embodiment, there is a height difference of 5.0 cm between a lower surface of the cross-shaped frame 15 and a lower surface of the settlement limit plate 2. The multi-parameter water-quality detection electrodes 14 are fixed on both sides of the cross-shaped frame 15 by plastic rings 151, specifically, fixed on one of the in-line borders located on both sides of the installing hole. In this embodiment, two boxes 91 and 92 respectively equipped with a power supply and a controller are installed on the settlement limit plate 2. The power supply is connected to the controller, and the multi-parameter water-quality detection electrode 14 is connected to an interface of the controller. The two boxes are symmetrically distributed on the settlement limit plate 2, and are ensured to have the same weight by placing a counterweight iron block.

In this embodiment, two DGT probes 13 are used, including a DGT probe for determining phosphorus and a DGT probe for determining metal cations that are arranged back-to-back. The DGT probe for determining phosphorus may include a polyethersulfone (PES) filter membrane, a ZrO binding gel, a polyacrylamide (PAM) diffusive gel, and a PES filter membrane that are arranged in sequence. The DGT probe for determining metal cations may include a PES filter membrane, a Chelex binding gel, a PAM diffusive gel, and a PES filter membrane that can be arranged in sequence. The two DGT probes can be pretreated before being placed in the test device for test. A pretreatment method is as follows: a 0.01 M NaCl solution is introduced with high-purity nitrogen; the two DGT probes for determining phosphorus and metal cations respectively are placed in this solution for 24 h deoxygenation and then stored in a nitrogen-filled bag; and the probes are installed when the test device needs to be used.

The movable mudguard device may include a connecting rod 6 and a mudguard 8. One end of the connecting rod 6 is installed outside the sampling tube 1 via a rotating shaft, and the mudguard 8 is fixedly installed on the other end of the connecting rod 6. The connecting rod 6 rotates around the rotating shaft to drive the mudguard 8 to move from a position where an opening at the lower end of the sampling tube 1 is sealed to a side of the sampling tube 1. In this embodiment, there are two connecting rods 6 that are located on both sides of the sampling tube 1, respectively, and shaft centers of the rotating shafts are arranged on both sides of a plane passing through a central axis of the sampling tube 1, and are located at the same horizontal height, thus forming a "swing arm" structure.

Figure 4:
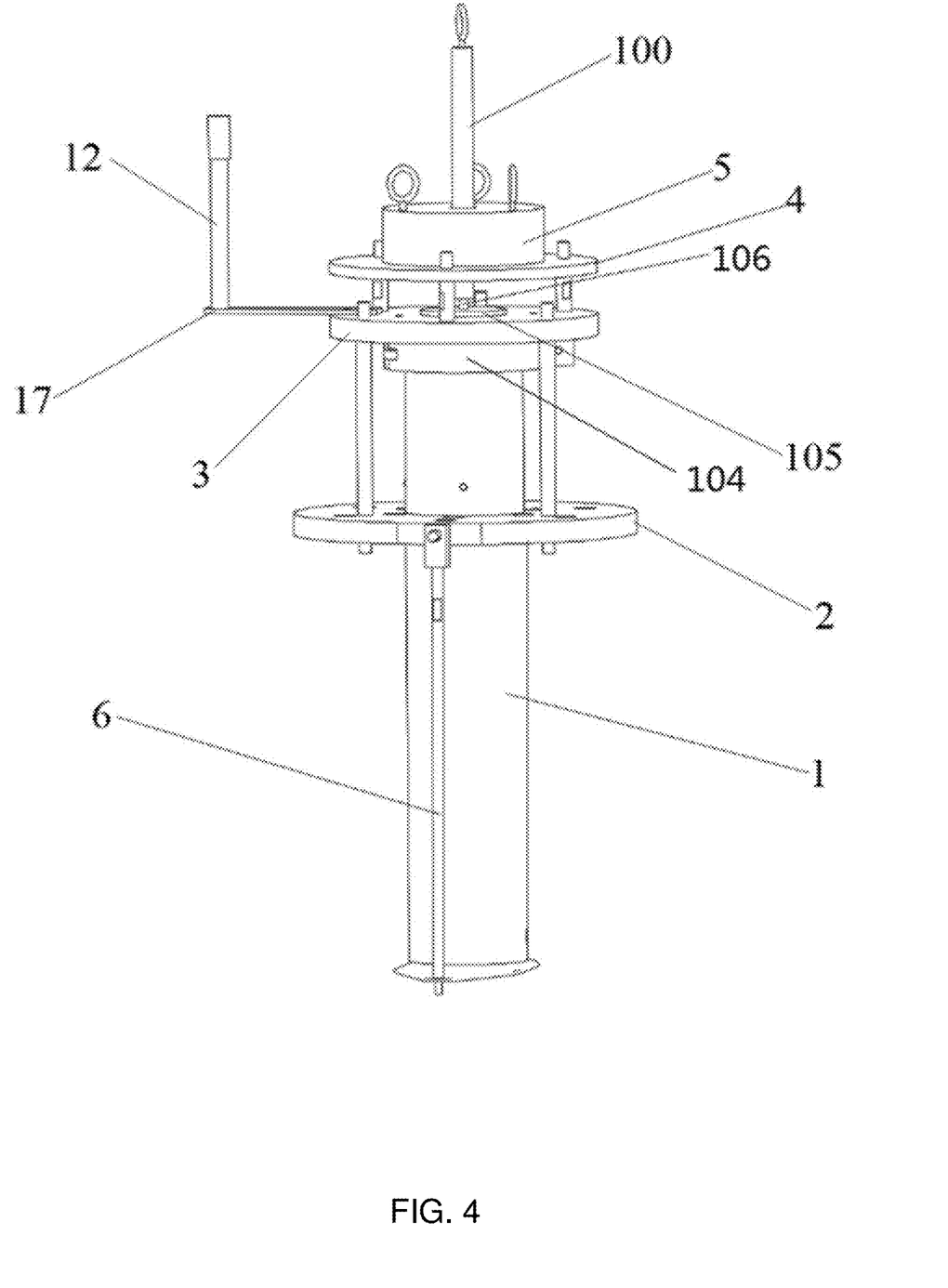
FIG. 4 is a schematic diagram illustrating a structure of the DGT probe test device for a sediment core in lake where the mudguard is at the bottom according to an embodiment of the present disclosure.
Figure 5:
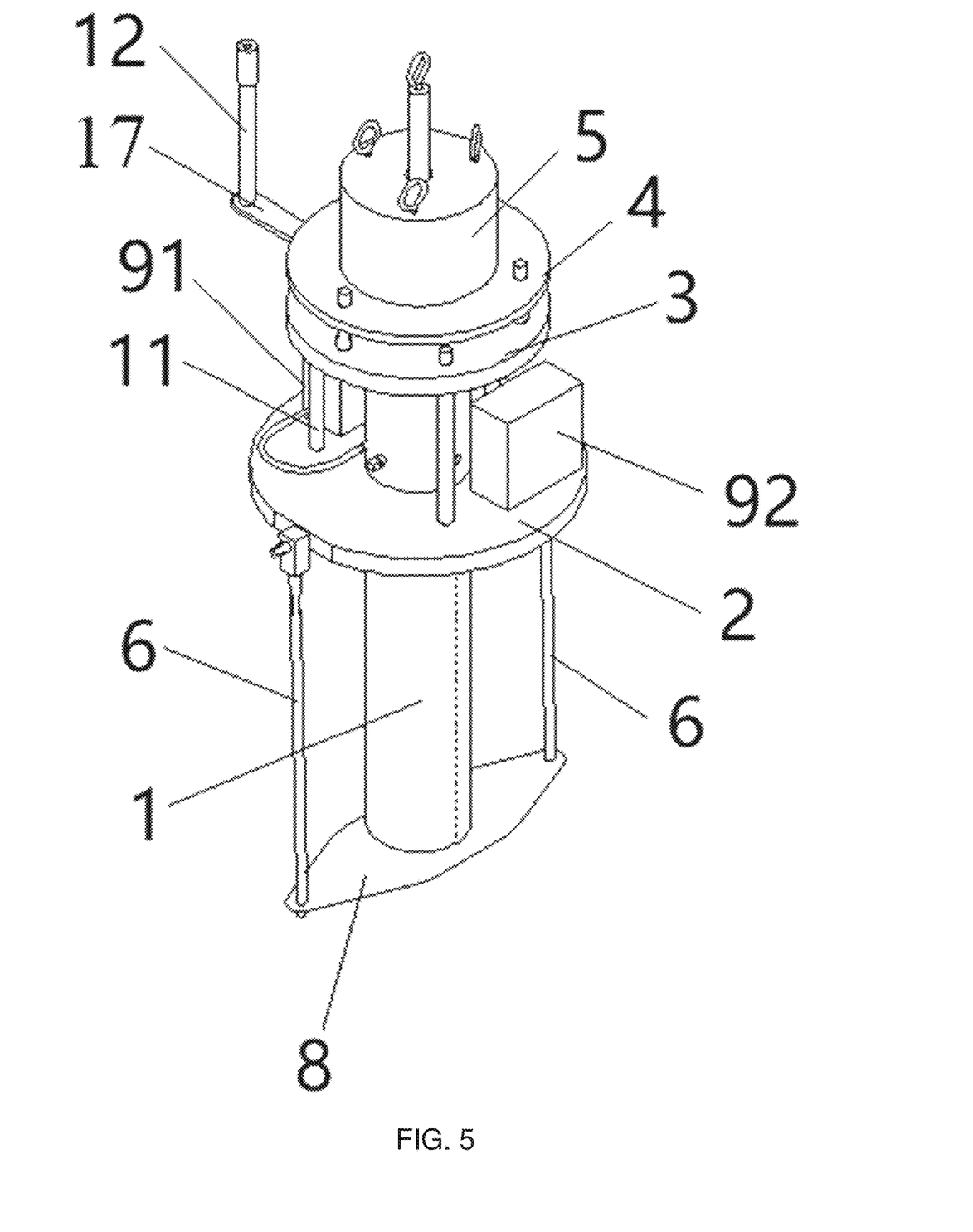
FIG. 5 is another view of the schematic diagram of FIG. 4 illustrating a structure of the DGT probe test device for a sediment core in lake where the mudguard is at the bottom according to an embodiment of the present disclosure.

In this embodiment, the mudguard 8 is arranged as a plane toward a side of the rotating shaft, and the plane is perpendicular to the connecting rod 6. In this embodiment, the mudguard 8 is made of a metal material and has a specified weight, so that the mudguard 8, when located at a side of the sampling tube 1, can rotate around the rotating shaft under gravity and fall from the side of the sampling tube 1 to the opening at the lower end of the sampling tube 1 to seal the opening at the lower end, as shown in FIG. 4 and FIG. 5. As a preferred embodiment, a heavy object can be added to one side of the mudguard 8 facing away from the rotating shaft, so as to accelerate the fall of the mudguard 8.

Two iron ring layers are disposed above the sampling tube 1, which are arranged coaxially with the sampling tube 1. There can be a spacing of 10 cm between the two iron ring layers. The two iron ring layers are fixedly connected by a first column fixed between an upper iron ring layer 4 and a lower iron ring layer 3, and the lower iron ring layer 3 is connected to the settlement limit plate 2 via four second columns 11. Bottoms of the second columns 11 can be fixed on the settlement limit plate 2 via removable screws.

As a preferred embodiment, a sealing cover 105 is disposed at a top opening of the sampling tube as shown in FIG. 4, and a through-hole is disposed on the sealing cover 105; the sealing cover 105 is sleeved on a center column 100 arranged in the vertical direction via the through-hole, and is suitable to slide along the center column 100 from a position at the top opening of the sampling tube to the above of the top opening of the sampling tube; and the sealing cover 105, when located at the top opening of the sampling tube, seals the top opening of the sampling tube. In this embodiment, a top end of the sampling tube is fixed on the lower iron ring layer via a sampling tube fixing clip; the lower iron ring layer is provided with a perforation; and the center column 100 is disposed on central axes of the upper iron ring layer and the lower iron ring layer and fixedly connected to the upper iron ring layer. In this embodiment, the top end of the sampling tube is open, and the top end of the sampling tube extends to a top surface of the lower iron ring layer; a top edge of the sampling tube is slightly higher than the top surface of the lower iron ring layer; and the sealing cover 105, when sliding down along the center column 100, can contact the top opening of the sampling tube to form a sealing structure. However, as an alternative embodiment, the top opening of the sampling tube may also be disposed below or in the perforation of the lower iron ring layer. In this embodiment, the sampling tube fixing clip is a circular ring clip composed of two semi-circular rings, where, one end is a hinge structure, and the other end adopts bolt fastening. When the bolt is tightened, the sampling tube can be clipped and fixed; and when the bolt is loosened, the sampling tube can be removed. When the sampling tube is put in water, the sealing cover 105 is automatically opened under an impulsive force of water. When the sampling tube is pulled out from water, the sealing cover 105 automatically seals the top opening of the sampling tube under gravity, and a negative pressure is formed at the upper end of the sampling tube, thereby further preventing sediment from overflowing the bottom of the sampling tube. The gasket limit pin 106 penetrates through the center column 100, such that a sealing cover 105 at the top of the sampling tube can only move vertically when the sealing cover 105 is pushed open.

The test device is also provided with a position-limit mechanism removably installed outside the sampling tube 1. In this embodiment, the position-limit mechanism is a limit pin 12 installed on the lower iron ring layer 3, and the limit pin is connected to the lower iron ring layer 13 via a cross bar 17; the cross bar 17 is arranged along a radial direction of the lower iron ring layer 13; the limit pin is arranged parallel to the lower iron ring layer and installed on an end of the cross bar 17 away from the lower iron ring layer 13; and the limit pin is inserted on the cross bar 17 and is suitable to be pulled out from the cross bar 17. The limit pin 12 confines the mudguard 8 to a side of the sampling tube 1, as shown in FIG. 1 and FIG. 2. When the limit pin 12 is pulled out, the mudguard 8 falls.

A hammering device is also disposed on an upper surface of the upper iron ring layer 4. In this embodiment, the hammering device is installed on a top surface of the upper iron ring layer 4, and the hammering device is a cylindrical hammering block 5 arranged coaxially with the sampling tube 1. Suspension rings are disposed on a top surface of the hammering block 5, and specifically, there are three suspension rings close to an edge of the hammering block 5, which are evenly arranged along the edge of the top surface of the hammering block 5. The center column 100 penetrates through a top end of the hammering block 5 and extends to the above of the hammering block 5. A suspension ring is also disposed on a top end of the center column 100, and a floating ball 7 is disposed above the hammering device. The floating ball 7 is connected to a suspension ring at a top end of a thick column of the hammering device via a first pull rope 101, and a bottom of the floating ball 7 is also provided with a second pull rope 102. An upper end of the second pull rope is connected to the floating ball 7. Each of the suspension rings at the edge is connected to a lower end of the second pull rope 102 via a connecting rope, and the floating ball 7 is connected to the limit pin 12 via a third pull rope 103. In this embodiment, a lower part of the center column 100 is configured as a thin rod structure, and an upper part is configured as a thick rod structure. A movable top cover slides along the thin rod structure of the center column 100 to reduce the size of a through-hole on the movable top cover and the area of a gap between the through-hole and the center column 100, thus improving a sealing effect. The thick rod structure has a high strength.

A method for using the above-described DGT probe test device for a sediment core in a lake is as follows:

(1) Assembly of the DGT probe test device for a sediment core: The DGT probe 13 and the electrodes 14 are installed on the locking device. That is, one DGT probe or two back-to-back DGT probes are first placed on the installing hole of the locking device, and then the fixing pin on the locking device is pushed to fix the handle part of the DGT probe(s) in the installing hole; and then the plastic ring 151 is used to fix two electrodes 14 on both sides of the cross-shaped frame 15, the plastic ring 151 is fixed on the cross-shaped frame 15 via fixing screws, and finally, the cross-shaped device is fixed inside the sampling tube 1 via screws.

(2) The settlement limit plate 2 is installed in the middle of the sampling tube to ensure that there is a height difference (e.g., 5 cm) between a lower surface of the cross-shaped frame 15 and a lower surface of the settlement limit plate 2. Two boxes are installed on an upper part of the sampling tube limit plate, one with a power supply inside and the other one with a controller inside. A counterweight iron block is placed in the lighter one of the two boxes to make the two have the same weight. The sealing cover 105 and the sampling tube fixing clip 104 are installed at the top and outside of the sampling tube, respectively. The center column 100 is fixed in the through-hole on the sealing cover 105. Then the upper part of the sampling tube is fixed on the lower iron ring layer via the sampling tube fixing clip 104, the lower iron ring layer 3 is fixedly connected to the settlement limit plate 2 via four second columns, and the upper iron ring layer 4 is fixedly connected to the lower iron ring layer 3 via the first column 10. Finally, the hammering block 5 is installed on an upper part of the upper iron ring layer 4.

(3) One end of the connecting rod 6 is installed on the settlement limit plate 2, and then the limit pin 12 is fixed on the upper iron ring layer 4.

(4) At a sampling point, a water depth is first measured with a portable ultrasonic echo sounder, and three pull ropes, or other flexible cord-type mechanisms, are then selected, which have a length suitable for the water depth at the sampling site. Installation of the three pull ropes on the test device: a first pull rope is used to connect the floating ball with a suspension ring at the top end of the center column 100 of the hollow hammering block; a second pull rope is used to connect the floating ball with a suspension ring at the edge of the hammering block; and a third pull rope is used to connect the limit pin with the floating ball. Start switches on the boxes with the power supply and the controller for electrodes are pressed to start the multi-parameter water-quality detection electrodes. The first pull rope is pulled to set the DGT probe test device down to a water bottom. The second pull rope 102 is then repeatedly pulled and the hammering block is used to hammer the sampling tube into sediment until the settlement limit plate 2 contacts with the sediment at the water bottom and the sampling tube no longer descends. At this time, the DGT test device is placed at a sediment/water interface, and a DGT test can be conducted.

(5) Some time later (e.g., 24 h later), the second pull rope 101 is lifted near the floating ball 7 and the limit pin 12 is pulled out so that the mudguard 8 rotates under gravity until a side of the mudguard facing toward the rotating shaft contacts with the opening at the lower end of the sampling tube to form a seal. Then, the first pull rope 101 is lifted to pull the device. During the lifting process, the mudguard continues to rotate under gravity to a position where the mudguard contacts with the opening at the lower end of the sampling tube to form a seal, at which time, the opening at the lower end of the sampling tube is sealed. The entire DGT test device is placed on a sampling boat, a gasket is used to seal the lower end of the sampling tube 1 and substitute for the mudguard, and the test of the multi-parameter water-quality detection electrodes is stopped by operating the controller.

(6) Removing the settlement limit plate 2 and the connected mudguard 8 on the sampling tube, two iron rings and the connected limit pin 12, and the hammering block 5, then removing the sealing cover 105 at the top of the sampling tube and the sampling tube fixing clip 104, dismantling the cross-shaped frame 15, and the DGT probe 13 is taken out and stored in an iced sample box. The DGT probe is transported to the laboratory for subsequent DGT slicing treatment, analysis and test, DGT calculation and plotting of metal and phosphorus distribution curves in a profile. Moreover, the multi-parameter water-quality detection electrodes 14, power supply, and controller are taken out to read the physical and chemical properties of the overlying sediment determined by the electrodes. Then, the top end of the sampling tube is sealed with a rubber plug, and the entire sampling tube is transported to the laboratory and steadily placed on a laboratory floor.

(7) In the laboratory, plugs in a series of Rhizon interfaces on the wall of the sampling tube are pulled out, and Rhizon connecting tubes are successively connected to the series of Rhizon interfaces. According to a vertical pore resolution (e.g., 1 cm), pore water in the sediment is extracted and collected for subsequent chemical analysis of pore water. After the pore water sampling is completed, the series of Rhizon interfaces on the wall of the sampling tube are plugged with plugs. The sediment core in the sampling tube is cut into layers with the aid of a piston jacking device, and sediment layers with a vertical spatial resolution (e.g., 1 cm) are collected for subsequent solid-phase chemical analysis.

Figure 7:
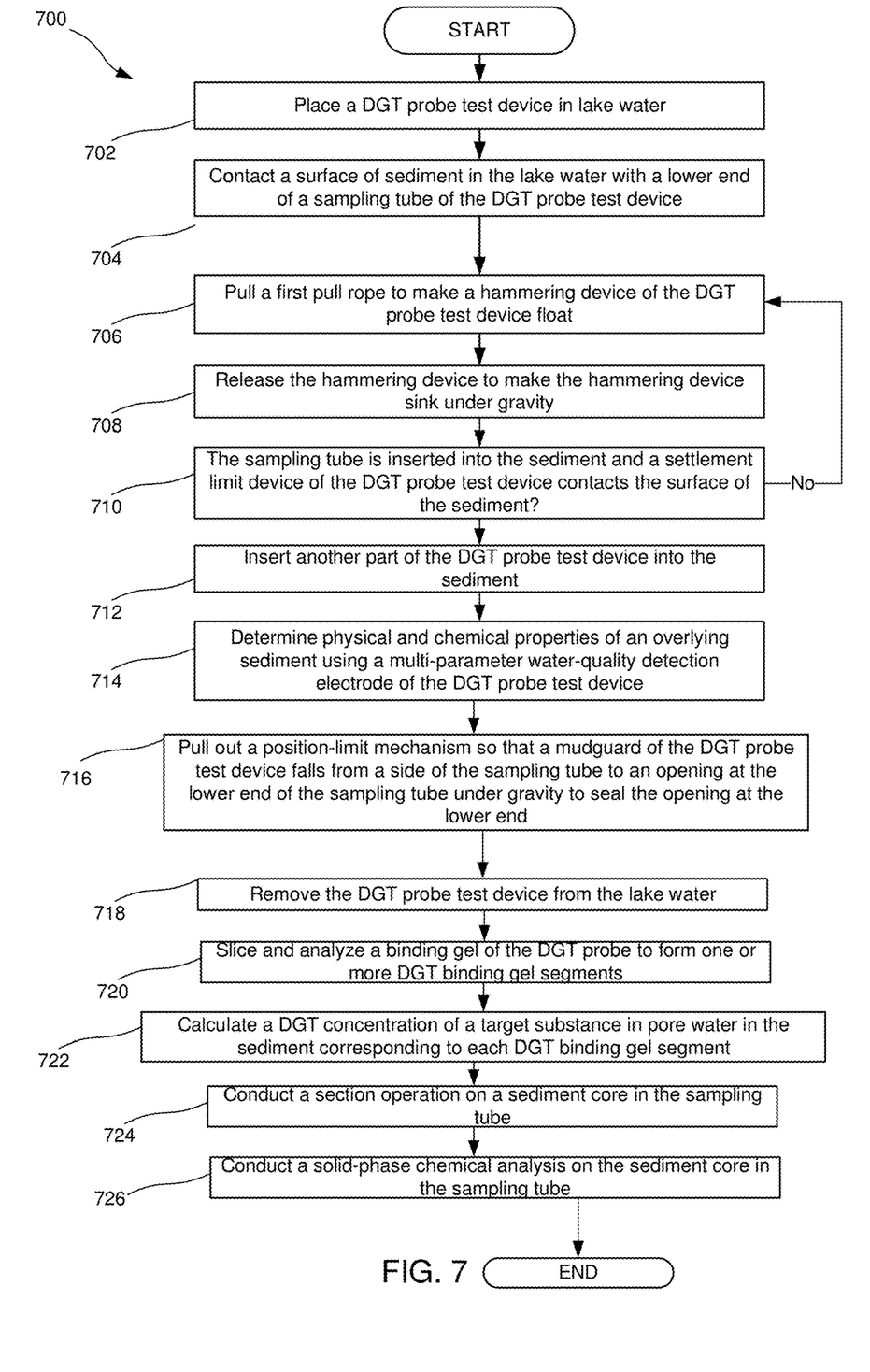
FIG. 7 illustrates an embodiment of a test method using embodiments of the DGT probe test device described herein.

FIG. 7 illustrates an embodiment of a test method using embodiments of the DGT probe test device described herein. The method 700 can include placing a DGT probe test device in lake water (Block 702); contacting a surface of sediment in the lake water with a lower end of a sampling tube of the DGT probe test device (Block 704); pulling a first pull rope to make a hammering device of the DGT probe test device float (Block 706); releasing the hammering device to make the hammering device sink under gravity (Block 708); and repeating the pulling and releasing until the sampling tube is inserted into the sediment and a settlement limit device of the DGT probe test device contact the surface of the sediment (Decision 710). The method can further include inserting another part of the DGT probe test device into the sediment (Block 712); using a multi-parameter water-quality detection electrode of the DGT probe test device to determine physical and chemical properties of an overlying sediment (Block 714); pulling out a position-limit mechanism so that a mudguard of the DGT probe test device falls from a side of the sampling tube to an opening at the lower end of the sampling tube under gravity to seal the opening at the lower end (Block 716); removing the DGT probe test device from the lake water (Block 718); slicing and analyzing a binding gel of the DGT probe to form one or more DGT binding gel segments (Block 720); calculating a DGT concentration of a target substance in pore water in the sediment corresponding to each DGT binding gel segment (Block 722); conducting a section operation on a sediment core in the sampling tube (Block 724); and conducting a solid-phase chemical analysis on the sediment core in the sampling tube (Block 726).

Figure 6:
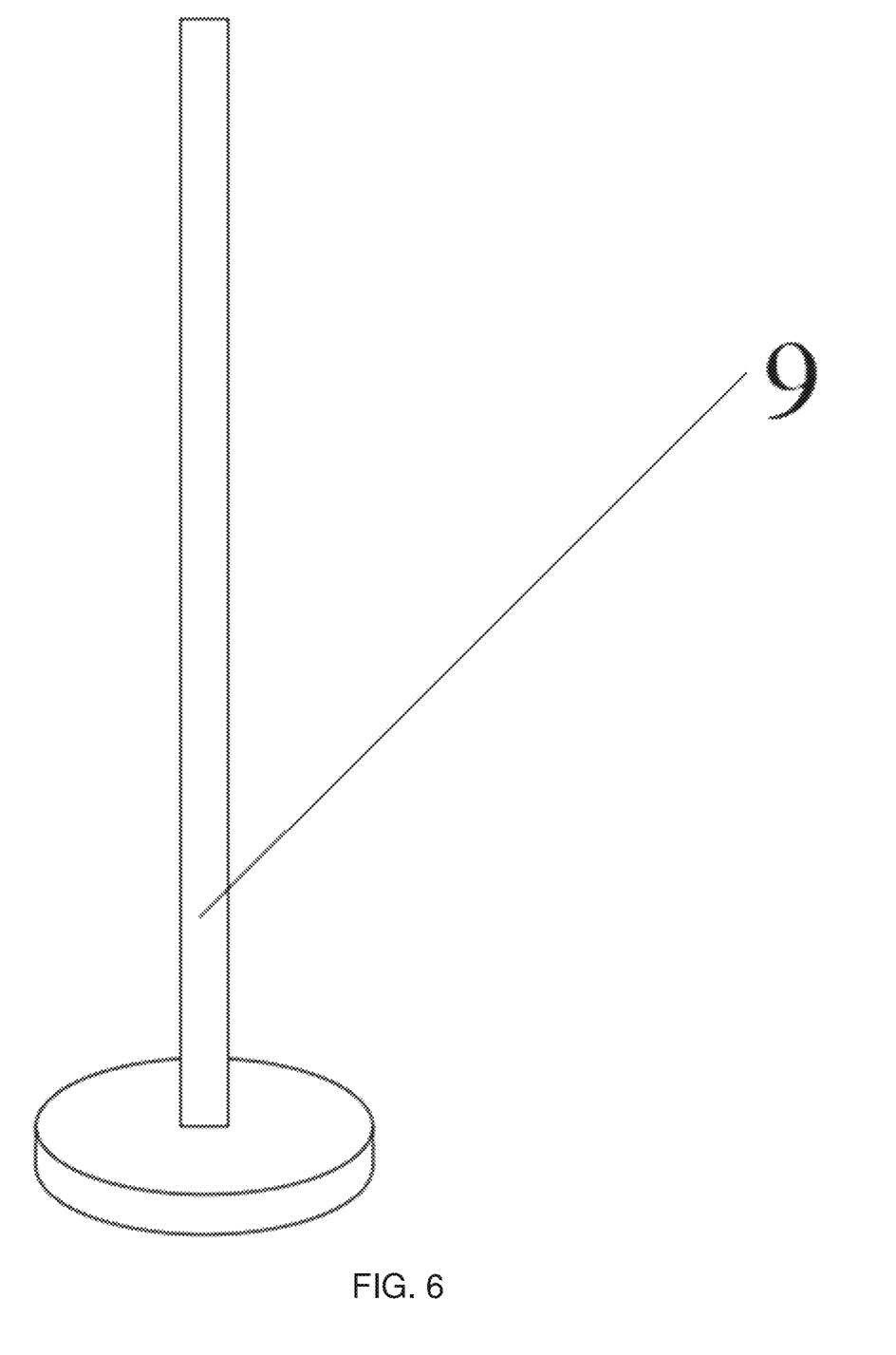
FIG. 6 is a schematic diagram illustrating a structure of the plastic ruler according to an embodiment of the present disclosure.

Based on the test device described above, when an on-site test was conducted, a study area was first selected. In this embodiment, the study area was selected in Lake Dianchi, Yunnan (China), with a water depth of 4 m to 10 m; and a total of 5 sampling sites were selected. The specific test method was as follows:

(1) The DGT probe test device for a sediment core in lake was placed in the lake, making the lower end of the sampling tube contact with a surface of sediment in the lake; the first pull rope 101 was pulled to make the hammering device float, the hammering device was released to make the hammering device vertically sink under gravity, and the operations were repeated many times until the sampling tube was inserted into the sediment and the surface of the sediment contacted with the settlement limit device. The operation can be completed with the aid of a plastic ruler 9, and as shown in FIG. 6, the ruler is a thin cylinder with a diameter of 1 cm, which is provided with a circular plane with a diameter of 2 cm at the bottom. When in use, the plastic ruler 9 was marked with a scale in advance, indicating a depth=depth at the sampling point−the thickness of the settlement limit plate (2 cm); then the ruler was vertically placed into the water, and an end of the ruler was placed right on a top surface of the settlement limit plate; and when the hammering device hammered the sampling tube, the ruler descended until the water level reached the scale on the ruler, at which time, a bottom surface of the settlement limit plate just contacted with a top surface of the sediment.

When the surface of the sediment was in contact with the settlement limit device, a part of the DGT probe was inserted into the sediment, that is, a depth of 2 cm in the DGT window was in the overlying water and a depth of 13 cm downward was inside the sediment. An in-situ DGT test could be conducted, and at the same time, the multi-parameter water-quality detection electrodes determined the physical and chemical properties of the surface sediment.

(2) 24 h later, the test was completed. The settlement limit plate of the sampling tube, the lower iron ring layer, the upper iron ring layer, the hammering block, the connecting rod, the mudguard, the sampling tube fixing clip, the sealing cover and limit pin at the top of the sampling tube, and the like were removed; then the cross-shaped frame was removed, and the electrodes and the two DGT probes were taken out; the controller and power supply were taken out; and the DGT probes were stored in an ice box. The top of the sampling tube was sealed with a rubber plug, a gasket was used to seal the lower end of the sampling tube 1 and substitute for the mudguard, and then the sampling tube was transported to the laboratory.

In the laboratory, data stored in the controller were imported into a computer for processing to obtain the Eh, pH, temperature, conductivity, and other values of the overlying sediment.

In the laboratory, the binding gel of the DGT probe was sliced and analyzed, and the DGT concentration was calculated for target substances in pore water of the sediment corresponding to each segment of the DGT binding gel. The specific method was as follows: the two DGT probes were opened, and ZrO and chelex-100 gels were taken out and cut according to the spatial resolution of 2 mm; then the two binding gels were soaked into 5 mL of a 1.0 mol/L NaOH eluent and 2 mL of a 1.0 mol/L $HNO_3$ eluent for 24 h, respectively; a ZrO eluate was neutralized to pH=7 with 1.0 mol/L $H_2SO_4$, and the phosphorus concentration in the eluate was determined by the phosphomolybdenum blue (PMB) photometric method; and the HR-ICP-MS instrument was used to determine metal cations (Fe, Zn, Pb, and Cd) in a chelex-100 eluate. Finally, the DGT calculation formula was used to calculate the DGT concentration of phosphorus or metal cations in sediment pore water corresponding to each segment of DGT binding gel.

$C_{DGT}$ was calculated as follows:

The mass (M) of absorbed phosphorus or metal cations was first calculated according to the concentration of phosphorus or metal cations in the eluate obtained by determination. A calculation formula of the M is as follows:

$$M=C_e(V_{gel}+V_{elution})/f_e$$

where, $C_e$ is the concentration of phosphorus or metal cation in the eluate; $V_{gel}$ is the volume of the binding gel; $V_{elution}$ is the volume of the eluate; and $f_e$ is an elution coefficient, with a value of 0.95 (phosphorus) or 0.80 (metal cation). Then M was substituted into the following formula to calculate the time-averaged concentration ($C_{DGT}$) of phosphorus or metal cation at the DGT probe/sediment interface:

$$C_{DGT}=M\Delta g/DAt$$

where, t is an operating time of DGT probe; A is an exposed area of the binding gel; D is a diffusion coefficient of a solute in the diffusive gel; and $\Delta g$ is the thickness of the diffusive gel plus the filter.

Based on a calculated DGT concentration, the profile curves of phosphorus and metal cations were plotted with a vertical spatial resolution of 2 mm.

Moreover, the sediment pore water was collected and tested as follows: the plugging device at an interface on the wall of the sampling tube was taken out, and a Rhizon connecting tube was connected to the interface; the sediment pore water was extracted and collected according to the vertical pore resolution of 1 cm; collected pore water was filtered through a 0.45 μm microporous cellulose acetate filter membrane, and then a phosphorus concentration was determined by the PMB photometric method; and metal cations (Fe, Zn, Pb, and Cd) were determined by the HR-ICP-MS instrument.

Section operation was conducted for the sediment in the sampling tube for solid-phase chemical analysis of sediment layers. Specifically, a piston jacking device and a cutting knife were used to slice the sediment core in the sampling tube into layers, and sediment layers with the vertical spatial resolution of 1 cm were collected. In this embodiment, a total of 13 segments were collected. The subsequent solid-phase chemical analysis of the sediment specifically included: the five-step sequential extraction method by Psenner and Pucsko (1988) and the PMB photometric method to analyze the phosphorus fractions; and the BCR four-step sequential extraction method and the HR-ICP-MS instrument to analyze the metal fractions in each sediment layer.

In addition, when the sediment was subjected to section operation, a matched piston jacking device and a cutting knife could be used to slice the sediment core in the sampling tube into sediment layers. The piston jacking device moved upward along the inner wall of the sampling tube to push the sediment out slowly. During the pushing process, the sediment column was cut with the cutting knife once every 1 cm height. A segment of sediment layer with a height of 1 cm was taken out each time, and a total of 13 segments, were used for subsequent solid-phase chemical analysis of the sediment.

The above examples are merely illustrative of several implementations of the present disclosure, and the description thereof is more specific and detailed, but should not be construed as limiting the patent scope of the present disclosure. It should be noted that those of ordinary skill in the art can further make several variations and improvements without departing from the essence and scope of the present disclosure, but such variations and improvements shall all fall within the scope of the present disclosure.

What is claimed is:

1. A diffusive gradients in thin films (DGT) probe test device for a sediment core in a lake, comprising:
    a sampling tube, wherein, a lower end of the sampling tube is open, a settlement limit device is disposed on an outer wall of the sampling tube, a DGT probe and a multi-parameter water-quality detection electrode are installed within the sampling tube, and the DGT probe extends in a vertical direction from above the settlement limit device to below the settlement limit device;
    a movable mudguard device comprising a connecting rod and a mudguard, wherein, one end of the connecting rod is installed outside the sampling tube via a rotating shaft; the mudguard is fixedly installed on an other end of the connecting rod; and the mudguard rotates around the rotating shaft under gravity and falls from a side of the sampling tube to an opening at the lower end of the sampling tube, so as to seal the opening at the lower end;
    a position-limit mechanism removably installed outside the sampling tube and configured to limit the movable mudguard device and confine the mudguard to a side of the sampling tube;
    a hammering device located above the sampling tube and fixedly connected to the sampling tube; and
    a floating ball located above the hammering device and connected to the hammering device via a first pull rope.

2. The DGT probe test device for a sediment core in the lake according to claim 1, wherein, a sealing cover is disposed at a top opening of the sampling tube, and a through-hole is disposed on the sealing cover; the sealing cover is sleeved on a center column arranged in the vertical direction via the through-hole, and is suitable to slide along the center column from a position at the top opening of the sampling tube to the above of the top opening of the sampling tube; and the sealing cover, when located at the top opening of the sampling tube, seals the top opening of the sampling tube.

3. The DGT probe test device for a sediment core in the lake according to claim 2, wherein, a locking device for installing the DGT probe and the multi-parameter water-quality detection electrode is disposed in the sampling tube, which is removably installed in the sampling tube; the locking device comprises a cross-shaped frame arranged in a horizontal direction; an installing hole is disposed at a central crossing position of the cross-shaped frame in the vertical direction; a top handle of the DGT probe is configured to be inserted into the installing hole; a pin hole is disposed on a side wall of the installing hole; a fixing pin for fixing the DGT probe is disposed in the pin hole; and
    the multi-parameter water-quality detection electrode is fixed on at least one of four side borders of the cross-shaped frame via a plastic ring.

4. The DGT probe test device for a sediment core in the lake according to claim 3, wherein, the settlement limit device is a settlement limit plate installed in the middle of the sampling tube and provided with water permeable holes; two boxes respectively with a power supply and a controller are installed on the settlement limit plate; the power supply is connected to the controller; and the multi-parameter water-quality detection electrode is connected to an interface of the controller.

5. The DGT probe test device for a sediment core in the lake according to claim 4, wherein, two iron ring layers are disposed above the sampling tube and are fixedly connected to each other via a column fixed between an upper iron ring layer and a lower iron ring layer; the lower iron ring layer is fixedly connected to the settlement limit plate; the hammering device is installed on a top surface of the upper iron ring layer; the sampling tube is fixed on the lower iron ring layer via a sampling tube fixing clip; the lower iron ring layer is provided with a perforation arranged corresponding to the top opening of the sampling tube; and the center column is fixedly connected to the upper iron ring layer.

6. The DGT probe test device for a sediment core in the lake according to claim 5, wherein, the hammering device is a cylindrical hammering block; at least three suspension rings are disposed on a top surface of the hammering block, which are evenly arranged along an edge of the top surface of the hammering block; each of the suspension rings is connected to a bottom of a second pull rope via a connecting rope; and a top of the second pull rope is connected to the floating ball.

7. The DGT probe test device for a sediment core in the lake according to claim 6, wherein, the position-limit mechanism is a limit pin, and an upper end of the limit pin is connected to the floating ball via a third pull rope.

8. The DGT probe test device for a sediment core in the lake according to claim 7, wherein, a Rhizon interface is disposed on a wall of the sampling tube in the vertical direction, and a plugging device is disposed at the Rhizon interface.

9. The DGT probe test device for a sediment core in the lake according to claim 8, wherein, the locking device is removably fixed on an inner wall of the sampling tube, and both ends of the sampling tube are open; and a piston jacking device is configured to slide along the inner wall of the sampling tube.

10. The DGT probe test device for a sediment core in the lake according to claim 3, wherein, two iron ring layers are disposed above the sampling tube and are fixedly connected to each other via a column fixed between an upper iron ring layer and a lower iron ring layer; the lower iron ring layer is fixedly connected to the settlement limit plate; the hammering device is installed on a top surface of the upper iron ring layer; the sampling tube is fixed on the lower iron ring layer via a sampling tube fixing clip; the lower iron ring layer is provided with a perforation arranged corresponding to the top opening of the sampling tube; and the center column is fixedly connected to the upper iron ring layer.

11. The DGT probe test device for a sediment core in the lake according to claim 10, wherein, the hammering device is a cylindrical hammering block; at least three suspension rings are disposed on a top surface of the hammering block, which are evenly arranged along an edge of the top surface of the hammering block; each of the suspension rings is connected to a bottom of a second pull rope via a connecting rope; and a top of the second pull rope is connected to the floating ball.

12. The DGT probe test device for a sediment core in the lake according to claim 11, wherein, the position-limit mechanism is a limit pin, and an upper end of the limit pin is connected to the floating ball via a third pull rope.

13. The DGT probe test device for a sediment core in the lake according to claim 12, wherein, a Rhizon interface is disposed on a wall of the sampling tube in the vertical direction, and a plugging device is disposed at the Rhizon interface.

14. The DGT probe test device for a sediment core in the lake according to claim 13, wherein, the locking device is removably fixed on an inner wall of the sampling tube, and both ends of the sampling tube are open; and a piston jacking device is configured to slide along the inner wall of the sampling tube.

15. The DGT probe test device for a sediment core in the lake according to claim 2, wherein, two iron ring layers are disposed above the sampling tube and are fixedly connected to each other via a column fixed between an upper iron ring layer and a lower iron ring layer; the lower iron ring layer is fixedly connected to the settlement limit plate; the hammering device is installed on a top surface of the upper iron ring layer; the sampling tube is fixed on the lower iron ring layer via a sampling tube fixing clip; the lower iron ring layer is provided with a perforation arranged corresponding to the top opening of the sampling tube; and the center column is fixedly connected to the upper iron ring layer.

16. The DGT probe test device for a sediment core in the lake according to claim 15, wherein, the hammering device is a cylindrical hammering block; at least three suspension rings are disposed on a top surface of the hammering block, which are evenly arranged along an edge of the top surface of the hammer block; each of the suspension rings is connected to a bottom of a second pull rope via a connecting rope; and a top of the second pull rope is connected to the floating ball.

17. The DGT probe test device for a sediment core in the lake according to claim 16, wherein, the position-limit mechanism is a limit pin, and an upper end of the limit pin is connected to the floating ball via a third pull rope.

18. The DGT probe test device for a sediment core in the lake according to claim 17, wherein, a Rhizon interface is disposed on a wall of the sampling tube in the vertical direction, and a plugging device is disposed at the Rhizon interface.

19. The DGT probe test device for a sediment core in the lake according to claim 18, wherein, the locking device is removably fixed on an inner wall of the sampling tube, and both ends of the sampling tube are open; and a piston jacking device is configured to slide along the inner wall of the sampling tube.

20. A test method based on the DGT probe test device for a sediment core in the lake according to claim 1, comprising:
(1) placing the DGT probe test device for a sediment core in the lake in lake water, and contacting a surface of sediment in the lake with the lower end of the sampling tube; pulling the first pull rope to make the hammering device float, releasing the hammering device to make the hammering device sink under gravity, and repeating the operations many times until the sampling tube is inserted into the sediment and the surface of the sediment contacts with the settlement limit device, at which time, a part of the DGT probe is inserted into the sediment, enabling an in-situ DGT test; and using the multi-parameter water-quality detection electrode to determine physical and chemical properties of an overlying sediment;
(2) after the test is completed, pulling out the position-limit mechanism so that the mudguard falls from a side of the sampling tube to an opening at the lower end of the sampling tube under gravity to seal the opening at the lower end; removing the DGT probe test device for a sediment core in lake out from the water body; taking out the DGT probe, and slicing and analyzing a binding gel of the DGT probe; calculating a DGT concentration of a target substance in pore water in sediment corresponding to each DGT binding gel segment; and conducting section operation for sediment core in the sampling tube, and conducting solid-phase chemical analysis for the sediment.

21. A method comprising:
placing a DGT probe test device in lake water;
contacting a surface of sediment in the lake water with a lower end of a sampling tube of the DGT probe test device;
pulling a first pull rope to make a hammering device of the DGT probe test device float;
releasing the hammering device to make the hammering device sink under gravity; and repeating the pulling and releasing until the sampling tube is inserted into the sediment and a settlement limit device of the DGT probe test device contact the surface of the sediment;
inserting another part of the DGT probe test device into the sediment;
using a multi-parameter water-quality detection electrode of the DGT probe test device to determine physical and chemical properties of an overlying sediment;
pulling out a position-limit mechanism so that a mudguard of the DGT probe test device falls from a side of the sampling tube to an opening at the lower end of the sampling tube under gravity to seal the opening at the lower end;
removing the DGT probe test device from the lake water;
slicing and analyzing a binding gel of the DGT probe to form one or more DGT binding gel segments;
calculating a DGT concentration of a target substance in pore water in the sediment corresponding to each DGT binding gel segment;
conducting a section operation on a sediment core in the sampling tube; and
conducting a solid-phase chemical analysis on the sediment core in the sampling tube.

* * * * *